US009538727B2

(12) United States Patent
Coba (10) Patent No.: US 9,538,727 B2
(45) Date of Patent: Jan. 10, 2017

(54) APPARATUS AND METHOD TO COLLECT CANINE WASTE (71) Applicant: Nelson Coba, Pembroke Pines, FL (US)

(72) Inventor: Nelson Coba, Pembroke Pines, FL (US)

(*) Notice: Subject to any disclaimer, the term of this patent is extended or adjusted under 35 U.S.C. 154(b) by 0 days.

(21) Appl. No.: 15/144,287

(22) Filed: May 2, 2016

(65) Prior Publication Data

US 2016/0324124 A1 Nov. 10, 2016

Related U.S. Application Data (60) Provisional application No. 62/156,419, filed on May 4, 2015.

(51) Int. Cl.
*A01K 29/00* (2006.01)
*A01K 23/00* (2006.01)
*B25G 1/10* (2006.01)
*A01K 1/01* (2006.01)

(52) U.S. Cl.
CPC ............ *A01K 23/005* (2013.01); *A01K 1/01* (2013.01); *B25G 1/102* (2013.01)

(58) Field of Classification Search
CPC ........ A01K 23/005; A01K 1/01; B25G 1/102; E01H 1/1206; E01H 2001/1226; E01H 2001/126; E01H 2001/1273; E01H 2001/128; E01H 2001/1286; E01H 2001/1266
USPC ........................................ 294/1.5, 1.3, 1.4
See application file for complete search history.

(56) References Cited

U.S. PATENT DOCUMENTS

| | | | | | |
|---|---|---|---|---|---|
| 3,786,780 | A | * | 1/1974 | Pezzino | A01K 23/005 119/161 |
| 3,819,220 | A | * | 6/1974 | Bredt | A01K 23/005 294/1.5 |
| 3,872,834 | A | * | 3/1975 | Fuhrman | A01K 15/003 119/801 |
| 4,103,953 | A | * | 8/1978 | Lachance | A01K 23/005 294/1.4 |
| 4,191,414 | A | * | 3/1980 | Dameron | E01H 1/1206 294/1.4 |
| 4,958,871 | A | * | 9/1990 | Hemans | E01H 1/1206 15/257.1 |
| 4,962,956 | A | * | 10/1990 | Scripter | E01H 1/1206 15/257.4 |
| 5,413,394 | A | | 5/1995 | Mitchell | |
| 5,971,452 | A | * | 10/1999 | Marymor | A01K 23/005 294/1.5 |
| 6,305,322 | B1 | | 10/2001 | Patel | |
| 6,386,606 | B1 | | 5/2002 | Marshall | |
| 6,648,387 | B2 | * | 11/2003 | Kaplan | A01K 23/005 294/1.5 |
| 6,702,349 | B2 | | 3/2004 | Clements | |

(Continued)

FOREIGN PATENT DOCUMENTS

DE 3807221 A1 * 9/1989 ........... A01K 23/005

*Primary Examiner* — Gabriela Puig
(74) *Attorney, Agent, or Firm* — Robert M. Schwartz; Alfred K. Dassler (57) ABSTRACT A dog waste collection device for holding a disposable bag, with a handle having a proximal end for a user to hold the device and a distal end opposite the proximal end, a loop affixed to the handle at the distal end of the handle, a projection extending radially away from the loop, with the projection securing the bag to the collection device while the collection device is used to collect dog waste.

8 Claims, 9 Drawing Sheets (56) References Cited

U.S. PATENT DOCUMENTS

| | | |
|---|---|---|
| D645,216 S | 9/2011 | Silas |
| 9,347,192 B1* | 5/2016 | Smith .................. E01H 1/1206 |
| 2007/0222240 A1 | 9/2007 | Sherman |
| 2009/0096227 A1* | 4/2009 | Pender ................ A01K 23/005 |
| | | 294/1.5 |
| 2011/0057463 A1 | 3/2011 | Chen |
| 2013/0009412 A1 | 1/2013 | Powell |
| 2013/0062895 A1* | 3/2013 | Groth ..................... A01K 29/00 |
| | | 294/1.3 |
| 2015/0164048 A1* | 6/2015 | Spandau .............. A01K 23/005 |
| | | 294/1.5 |

* cited by examiner

Detail A

APPARATUS AND METHOD TO COLLECT CANINE WASTE

CROSS REFERENCE TO RELATED APPLICATIONS

This application claims benefit of U.S. Provisional Patent Application No. 62/156,419 filed May 4, 2016, entitled An Apparatus and Method to Collect Canine Waste, the disclosure of which is incorporated herein by reference in its entirety.

BACKGROUND OF THE INVENTION

The collection and disposal of dog fecal waste is mandatory in many municipalities, aids in general sanitation, reduces insect activity, and is more sightly. The term waste will be employed as a synonym for the feces or fecal matter produced by the dogs or other living creatures.

Many dog owners or caretakers employ a device for gathering the waste off the ground and places the waste in a ubiquitous plastic bag for disposal. This system has some drawbacks; including, but not limited to, not gathering all the waste material from the ground, the possible soiling of the dog's owner during the transfer of the waste from the ground to a plastic bag, and a difficulty of those who may find it difficult to bend over to retrieve the waste.

A device which would obviate the drawbacks would be desirable.

BRIEF SUMMARY OF THE INVENTION

The invention comprises a telescoping handle attached to loop. A disposable plastic bag is opened and the opened end is folded about the loop. The plastic bag is then secured to the loop on a projection located proximal to the telescoping handle. When the telescoping handle is extended, it permits a standing person to collect and dispose of the canine waste. This is performed by placing the loop and disposable bag under the anus of the dog when the dog or other animal assumes a squatting position prior to defecating. In this fashion the waste is intercepted and falls into the disposable bag as opposed to the ground. The projection holds the plastic bag in place. The upper ends of the plastic bag can be wrapped around the projection to hold the plastic bag in place. The handles of plastic bags can be placed on the projections. Then the plastic bag is easily removed from the projections so the plastic bag can be disposed of in a sanitary fashion. This can all be performed while the owner is standing. Nothing but the interior of the bag comes in contact with the waste, making the overall process more sanitary. There are no connecting devices that must be unfastened in order to secure or disengage the bag.

It is accordingly an object of the invention to provide a dog waste collection device for holding a bag, with a handle having a proximal end for a user to hold the device and a distal end opposite the proximal end, a loop affixed to the handle at the distal end, a projection extending radially away from the loop, and the projection securing the bag.

With the foregoing and other objects in view, the loop affixed to the handle is at a connection point, the projection beginning between the connection point and the proximal end.

In accordance with another feature of the invention, the projection is two projections disposed on opposite sides of the handle.

In accordance with an added feature of the invention the projections and the handle are substantially parallel to one another.

With the objects of the invention in view, there is also provided a loop with a surface roughening for assisting in gripping the bag.

In accordance with yet a further feature of the invention is a mounting block mounted on the distal end of the handle, a projection being an extension of the loop, the projection having a form lock with the mounting block for preventing a rotation of the loop relative to the handle.

In accordance with another added feature of the invention the loop has a bend that inclines a distal portion of the loop with respect to the handle.

In accordance with another feature of the invention, the telescopic handle has a proximal end for a user to hold the device and a distal end opposite the proximal end, a loop affixed to the handle at the distal end, the loop being affixed to the handle at a connection point, a projection securing the bag, the projection being disposed on the handle between the connection point and the proximal end.

The apparatus will be further explained by the drawings and their description.

DETAILED DESCRIPTION OF THE INVENTION

Figure 1:
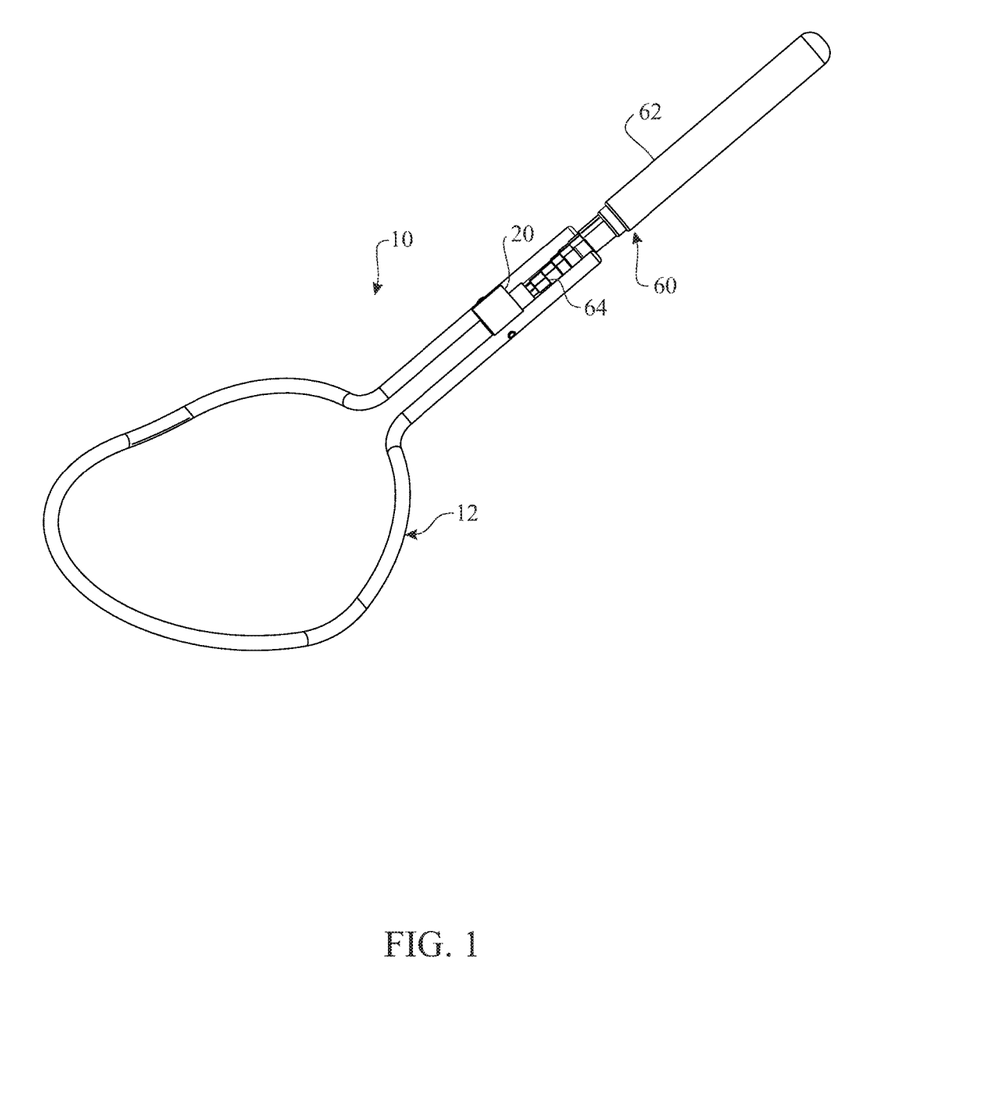
FIG. 1 is a front perspective view of the waste collection apparatus of the present invention.

Referring now to FIG. 1, a front perspective view of the dog waste collection apparatus 10 is shown, having a loop 12 which is attached to a mounting block 20. Mounting block 20 is attached to a telescoping handle 60 using a mounting block arrangement, to prevent rotation of the loop 12 relative to the telescoping handle 60.

Figure 2:
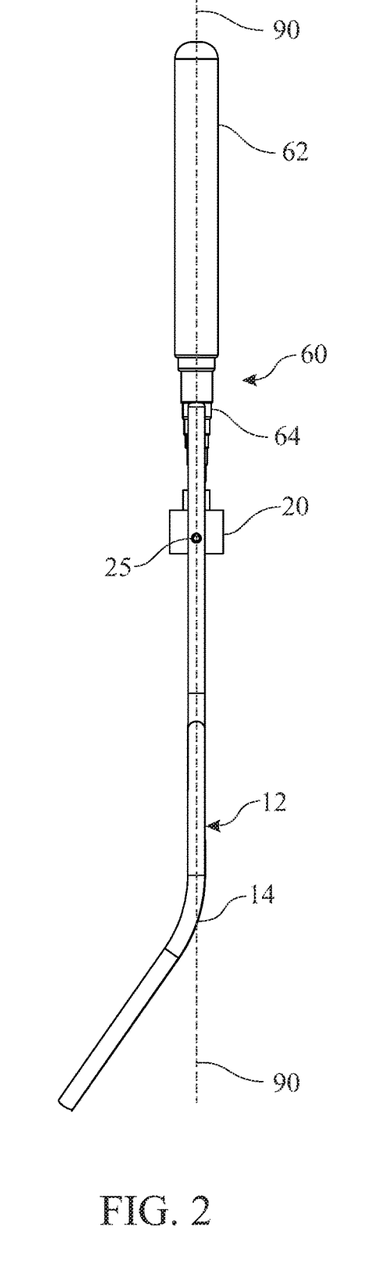
FIG. 2 is a side view of the waste collection apparatus.
Figure 3:
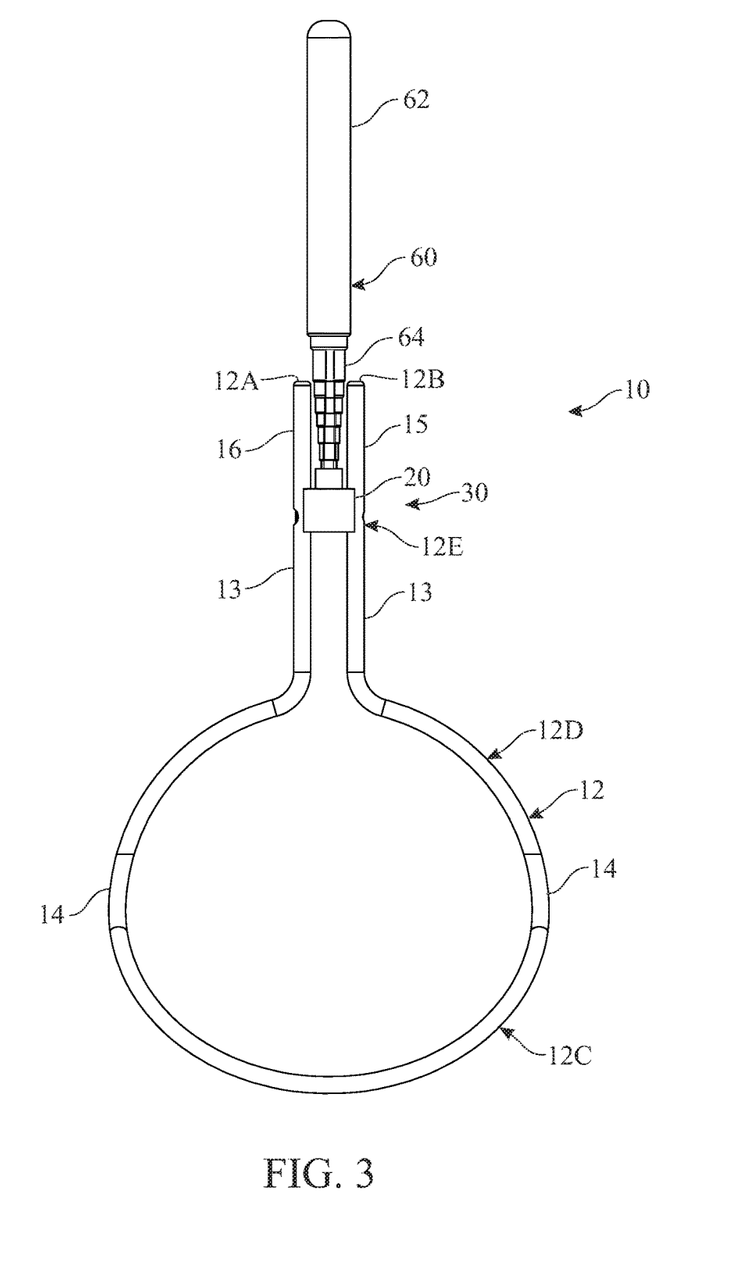
FIG. 3 is a front view of the waste collection apparatus.
Figure 4:
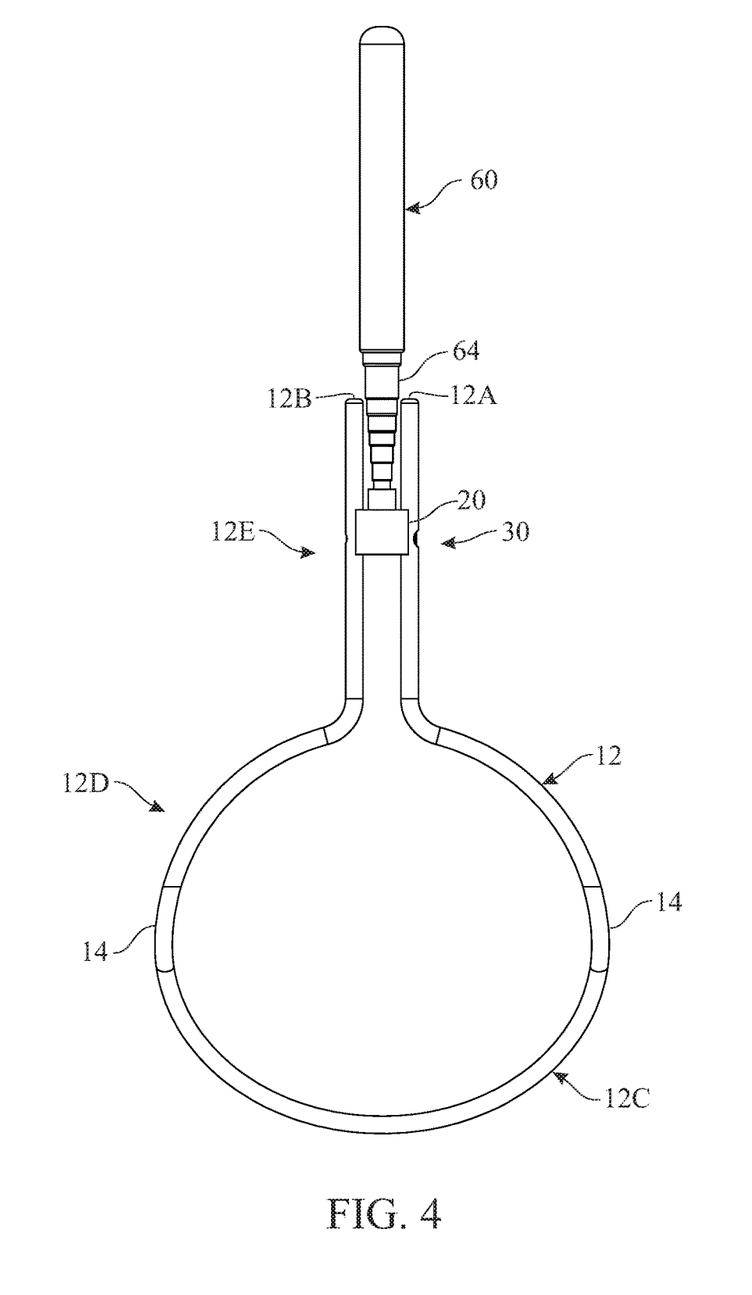
FIG. 4 is a rear view of the waste collection apparatus.
Figure 5:
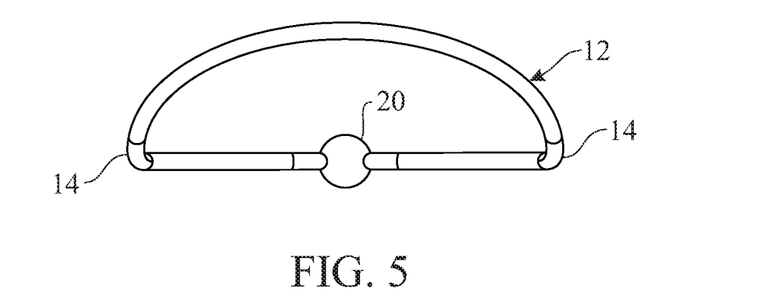
FIG. 5 is a bottom view of the waste collection apparatus.
Figure 6:
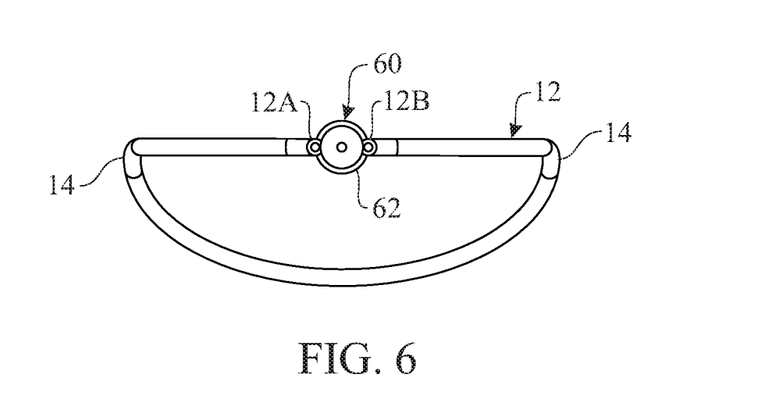
FIG. 6 is a top view of the waste collection apparatus.
Figure 8:
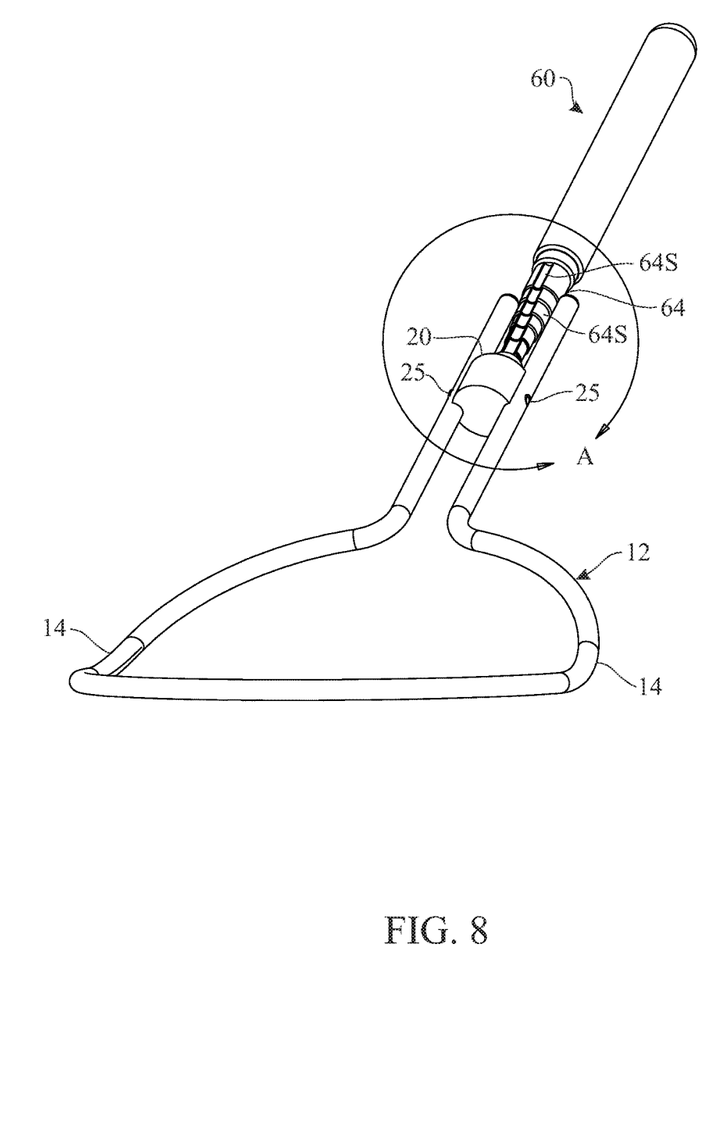
FIG. 8 is a front perspective view of the waste collection apparatus showing the location of Detail A an enlarged portion shown in FIG. 9.
Figure 9:
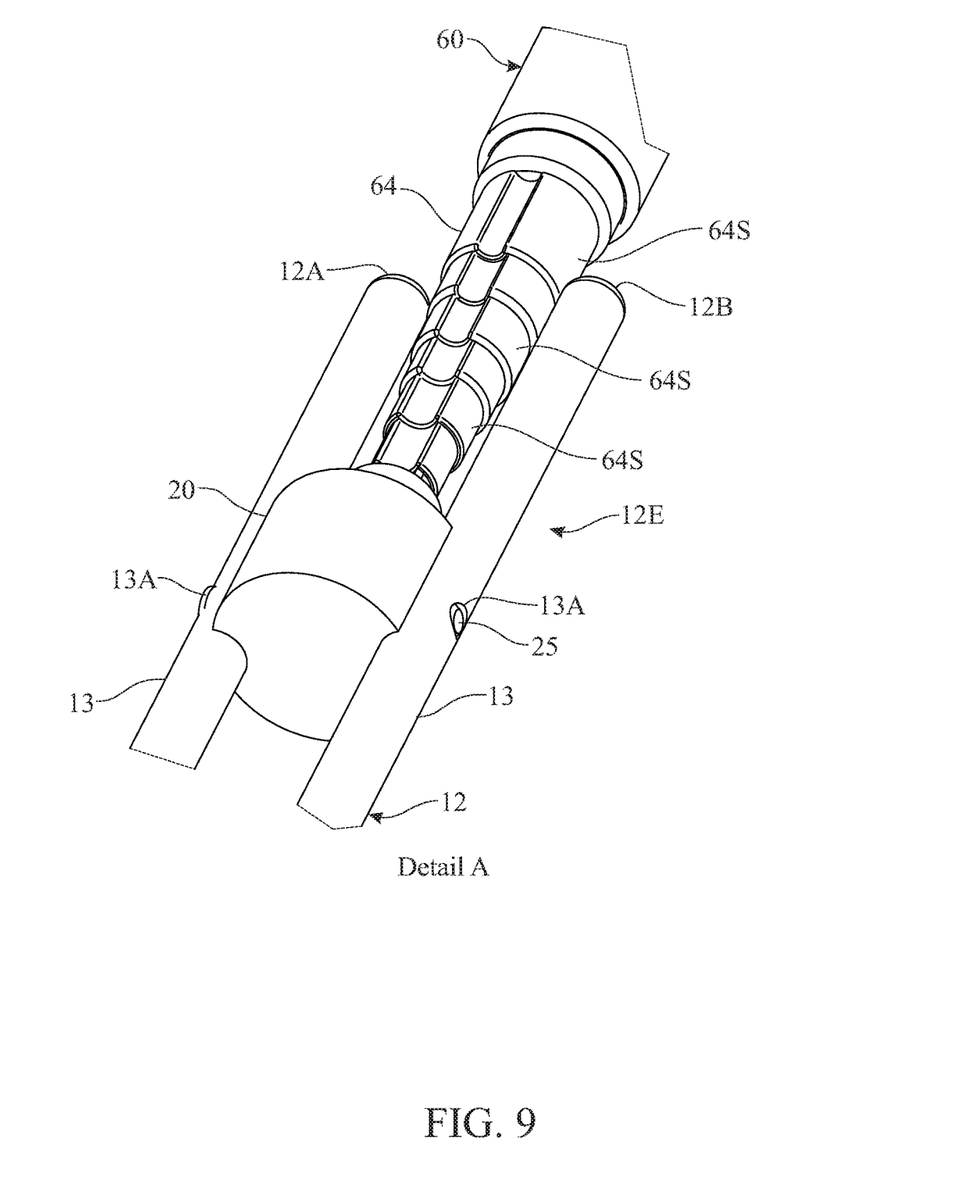
FIG. 9 is a perspective view of the enlarged Detail A from FIG. 8.

The loop 12 is formed with an elongated tubular rod, solid or hollow, having two ends 12A and 12B. Loop 12 can have a smooth or a textured finish, the latter adding additional securing capability to maintain the bag 100 on the loop 12 when the dog waste collection apparatus is in use. As used herein, textured surface or finish means that the surface has a rough or raised texture similar to sandpaper. Referring to FIG. 3, loop 12 has a distal portion 12C, a medial portion 12D and a proximal portion 12E. The distal portion 12C and medial portion 12E of loop 12, as seen in FIG. 3, from a top view have generally a circular shape, though they can be of any shape, including oval shape or rectangular shape. The distal portion 12C of loop 12, as seen in FIGS. 2 and 8, has a bend 14 on both sides of loop 12, of approximately thirty degrees from the longitudinal axis 90 of telescoping handle 60.

In the proximal portion 12E of loop 12 the tubular rod portions of loop 12 are in the shape of two elongated parallel segments 13. Each segment 13 includes a connector pin loop opening 13A that are aligned to receive a connector pin 25 there-through.

Telescoping handle 60 has a grip 62, a telescoping arm 64 and a mounting block 20. Grip 62 is securely attached to telescoping arm 64. The distal end of telescoping arm 64 is attached to mounting block 20. Telescoping arm 64 has individual segments 64S each having a non-round profile in cross section to prevent rotation of the segments 64S with respect to one another. This prevents the loop 12 from rotating with respect to the grip 62 if a torque is applied about the axis 90.

Figure 10:
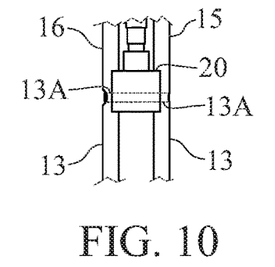
FIG. 10 is a partial diagrammatic front view showing the loop and mounting block not connected to the handle and without the connector pin.
Figure 11:
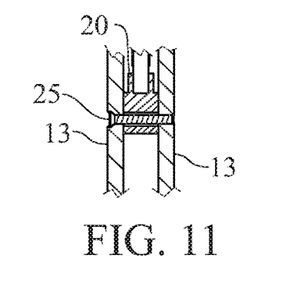
FIG. 11 is a partial diagrammatic front view showing in section the loop, mounting block not connected to the handle and the connector pin.
Figure 12:
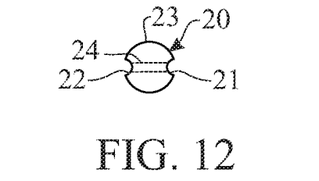
FIG. 12 is a diagrammatic top view showing the mounting block without the connector pin.

As seen in FIGS. 10, 11 and 12, mounting block 20 is generally cylindrical in shape and has detents 21 and 22 on opposite sides of an outer wall 23 of mounting block 20. A connector pin opening 24 extends from detent 21 to detent 22 through mounting block 20 to receive connector pin 25.

Loop 12 is attached to mounting block 20 at attachment point 30 in the proximal portion 12E of loop 12. However attachment point 30 can be at any location along loop 12 where loop 12 can be attached to mounting block 20. As seen in FIGS. 3 and 10, at attachment point 30, the parallel longitudinal rod segments 13 of loop 12 are in the detents 21 and 22 and connector pin 25 is securely within connecting pin opening 24 to securely hold loop 12 to mounting block 20. The loop 12 having a form lock with the mounting block for preventing a rotation of the loop relative to the handle 60. As used herein, a form-locking connection is one that connects two elements together due to the shape of the elements themselves, as opposed to a force-locking connection, which locks the elements together by force external to the elements.

Figure 10A:
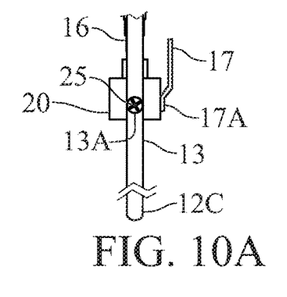
FIG. 10A is a partial diagrammatic side view showing an alternate embodiment of a projection depending from the mounting block not connected to the handle, and showing the orientation of the mounting block to the distal portion of the loop.

It can also be seen that a first projection 15 and a second projection 16 is located between the connection point 30 and the proximal end of telescoping handle 60. Projection 15 has an end at 12B and projection 16 has an end at 12A. A projection can be in other locations, preferably in close proximity to connection point 30. A projection can depend from loop 12, mounting block 20 or telescoping handle 60. See FIG. 10A, with projection 17 attached at 17A to mounting block 20 extending radially from mounting block 20 away from the distal portion 12C of loop 12. The projections extend radially away from loop 12.

Although connector pin 25 keeps loop 12 connected to mounting block 20, nuts and bolts may also may be used to connect different elements of the dog waste collection apparatus 10 together. Any mechanical fastener with sufficient material properties may be employed.

Referring now specifically to FIG. 2, a side view of the dog waste collection apparatus 10 is shown. The angle at bend 14 of the loop 12 is shown to be about 30 degrees. This angle may be in a range of angles from 10 to 60 degrees. The bend 14 in loop 12 facilitates the disposable bag 100 staying in place as well as permitting the bag to get underneath the dog when defecating. Additionally, it has been surprisingly found by the inventor that the bag 100 is supported more securely on loop 12, and less likely to become loosened, with the bend 14 in loop 12 than with a loop 12 without a bend 14 therein.

Figure 7:
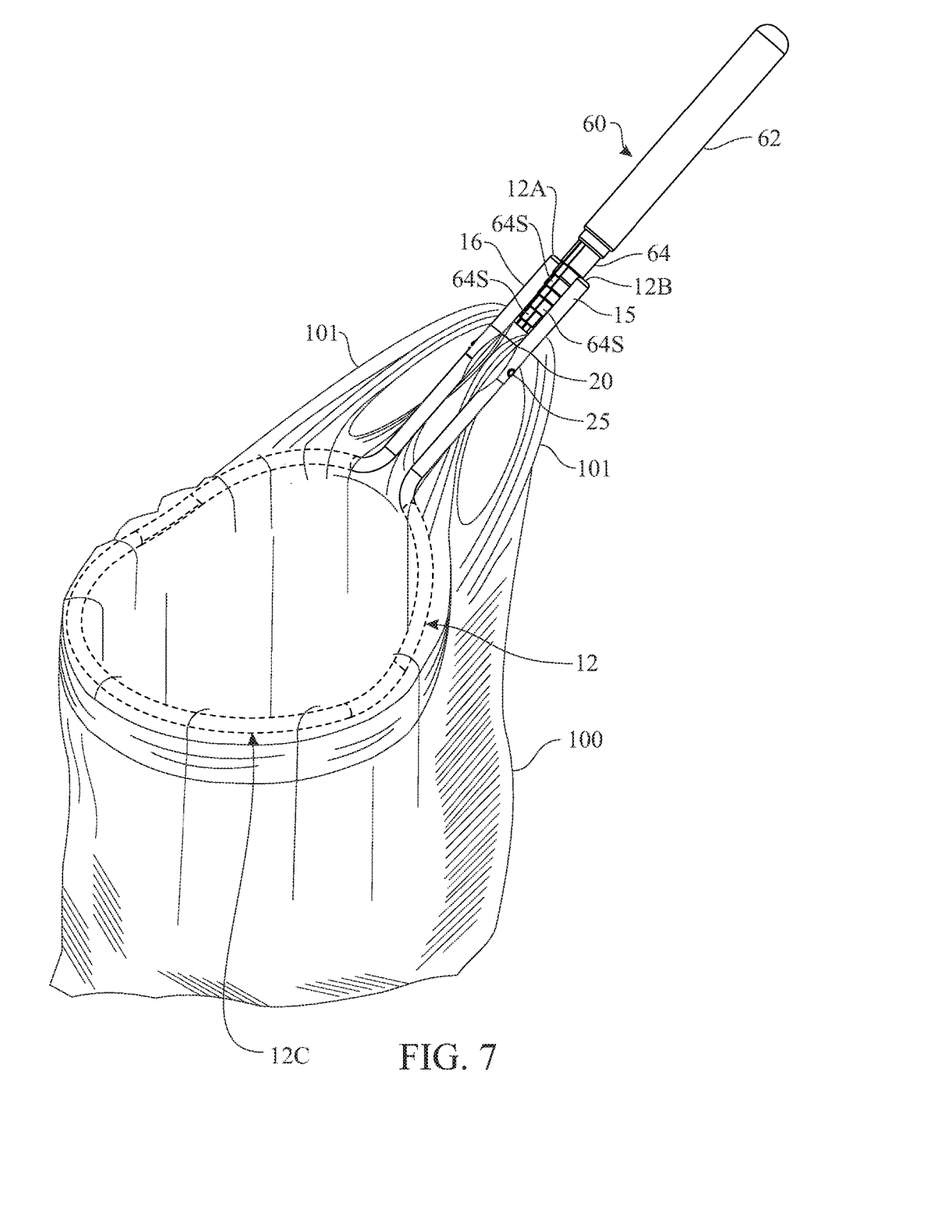
FIG. 7 is a perspective view of the waste collection apparatus with a disposable bag attached and in a secured position. In this view, the loop is shown in dashed lines since it is beneath the disposable bag that is folded over the loop.

Referring now specifically to FIG. 7, a perspective view of the waste collection apparatus 10 with a disposable bag 100 in position around and over the loop 12, and held in place by one or more projections 15, 16. As seen in FIG. 7, if the bag 100 has bag handles 101, one or more of the bag handles 101 can be secured about a projection, including projections 15 or 16, or projection 17 in an alternate embodiment, to secure the bag 100 to the dog waste collection apparatus 10 while the dog is defecating. In the event bag 100 does not have bag handles, then the upper portion of the bag 100 can easily be twisted around one of the projections or the upper portion of the bag 100 can be pierced such that the projection will go through a portion of the upper portion of the bag 100 in order to secure the bag 100 to the projection and to the dog waste collection apparatus 10. At this point the waste collection apparatus is ready to use. When a dog needs to defecate, the user places the bag 100 under the anus of the dog (not shown). When the dog has finished, one disengages the plastic bag 100 from the projection and the loop 12. The bag 100 is then disposed in a proper manner.

In a preferred embodiment, the telescoping arm 60 from the proximal end or top of the grip 62 to the mounting block 20 is approximately 38 inches. The diameter of the loop 12 is approximately 5 to 6 inches.

While the invention has been described in its preferred form or embodiment with some degree of particularity, it is understood that this description has been given only by way of example and that numerous changes in the details of construction, fabrication, and use, including the combination and arrangement of parts, may be made without departing from the spirit and scope of the invention.

I claim:

1. A dog waste collection device for holding a bag, the device comprising:
   a handle having a proximal end for a user to hold the device and a distal end opposite said proximal end;
   a loop affixed to said handle at said distal end;
   a projection extending radially away from said loop, said projection securing the bag; a mounting block mounted on said distal end; said projection being an extension of said loop; and said projection having a form lock with said mounting block for preventing a rotation of said loop relative to said handle.

2. A dog waste collection device for holding a bag according to claim 1, wherein said loop is affixed to said handle at a connection point, said projection beginning between said connection point and said proximal end.

3. A dog waste collection device for holding a bag according to claim 2 said projection is two projections disposed on opposite sides of said handle.

4. A dog waste collection device for holding a bag according to claim 3, wherein said projections and said handle are substantially parallel to one another.

5. A dog waste collection device for holding a bag according to claim 1, wherein said loop has a surface roughening for assisting in gripping the bag.

6. A dog waste collection device for holding a bag according to claim 1, wherein said loop is connected to said mounting block with a mechanical fastener.

7. A dog waste collection device for holding a bag according to claim 1, wherein said loop has a bend that inclines a distal portion of said loop with respect to said handle.

8. A dog waste collection device for holding a bag, the device comprising:
- a handle having a proximal end for a user to hold the device and a distal end opposite said proximal end;
- a loop affixed to said handle at said distal end, said loop being affixed to said handle at a connection point;
- a projection securing the bag, said projection being disposed on said handle between said connection point and said proximal end; a mounting block mounted on said distal end; said projection being an extension of said loop; and said projection having a form lock with said mounting block for preventing a rotation of said loop relative to said handle.

\* \* \* \* \*